US005744691A

United States Patent [19]

Tischler

[11] Patent Number: 5,744,691
[45] Date of Patent: *Apr. 28, 1998

[54] METHOD FOR TREATING SOLIDS CONTAMINATED WITH HYDROCARBONS

[75] Inventor: Siegfried E. Tischler, Jakarta Selatan, Indonesia

[73] Assignee: Successful Venture Enterprises, Inc., Virgin Islands (Br.)

[*] Notice: The term of this patent shall not extend beyond the expiration date of Pat. No. 5,414,205.

[21] Appl. No.: 751,175

[22] Filed: Nov. 15, 1996

Related U.S. Application Data

[63] Continuation-in-part of Ser. No. 382,980, Feb. 3, 1995, Pat. No. 5,625,119, which is a continuation-in-part of Ser. No. 68,512, May 27, 1993, Pat. No. 5,414,205.

[30] Foreign Application Priority Data

Jun. 22, 1992 [ID] Indonesia .................. P-003381

[51] Int. Cl.$^6$ .................................................. A63D 3/00
[52] U.S. Cl. ...................... 588/214; 588/205; 588/209; 588/900; 134/1; 403/263
[58] Field of Search .......................... 588/205, 209, 588/228, 900, 214; 110/224; 134/1; 425/263

[56] References Cited

U.S. PATENT DOCUMENTS

| 3,716,095 | 2/1973 | Retzman et al. ............ 423/DIG. 16 |
|---|---|---|
| 3,907,674 | 9/1975 | Ruberts ........................... 588/242 |
| 4,436,037 | 3/1984 | Kno ................................. 588/228 |
| 4,648,332 | 3/1987 | Goedhart ......................... 110/346 |
| 4,671,944 | 6/1987 | Schramm ......................... 423/659 |
| 4,673,510 | 6/1987 | Janusch et al. .................. 210/712 |
| 4,977,839 | 12/1990 | Fochtman et al. .............. 110/346 |
| 4,996,930 | 3/1991 | Yip et al. ....................... 110/249 |
| 5,200,033 | 4/1993 | Weitzman ....................... 159/47.1 |
| 5,219,534 | 6/1993 | Reynolds ....................... 472/186.3 |
| 5,224,432 | 7/1993 | Milsap ........................... 110/341 |
| 5,414,205 | 5/1995 | Tischler ......................... 588/205 |
| 5,625,119 | 4/1997 | Tischler ......................... 588/900 |

Primary Examiner—Gary P. Straub
Attorney, Agent, or Firm—Christie, Parker & Hale, LLP

[57] ABSTRACT

A method for treating contaminated solids such as contaminated soil or sludge includes feeding the solids into a preheater and pneumatically conveying the solids through the preheater by preheated primary air into and through an oxidation chamber by cocurrent flow. Secondary air is directed into the oxidation chamber through a plurality of perforations in the wall of the oxidation chamber to combine with and sustain the fluidized state of the solid-gas mixture. The primary air is preferably produced by an air blower which blows the air through a preheater to produce hot air. The temperature of the fluidized bed is controlled by the temperature of the primary air. The temperature should be hot enough that the lighter hydrocarbons spontaneously ignite in the oxidation chamber. The exothermic combustion causes the remaining organic material present in the contaminated solids to then vaporize and burn. The product of this process, termed flash oxidation, is a mixture of treated solids, excess hot gas and gaseous and solid oxidation products. This mixture is separated such as by one or more cyclone separators or a baghouse to produce treated solids and process gas in a once-through process with essentially no recycle of solids.

13 Claims, 4 Drawing Sheets

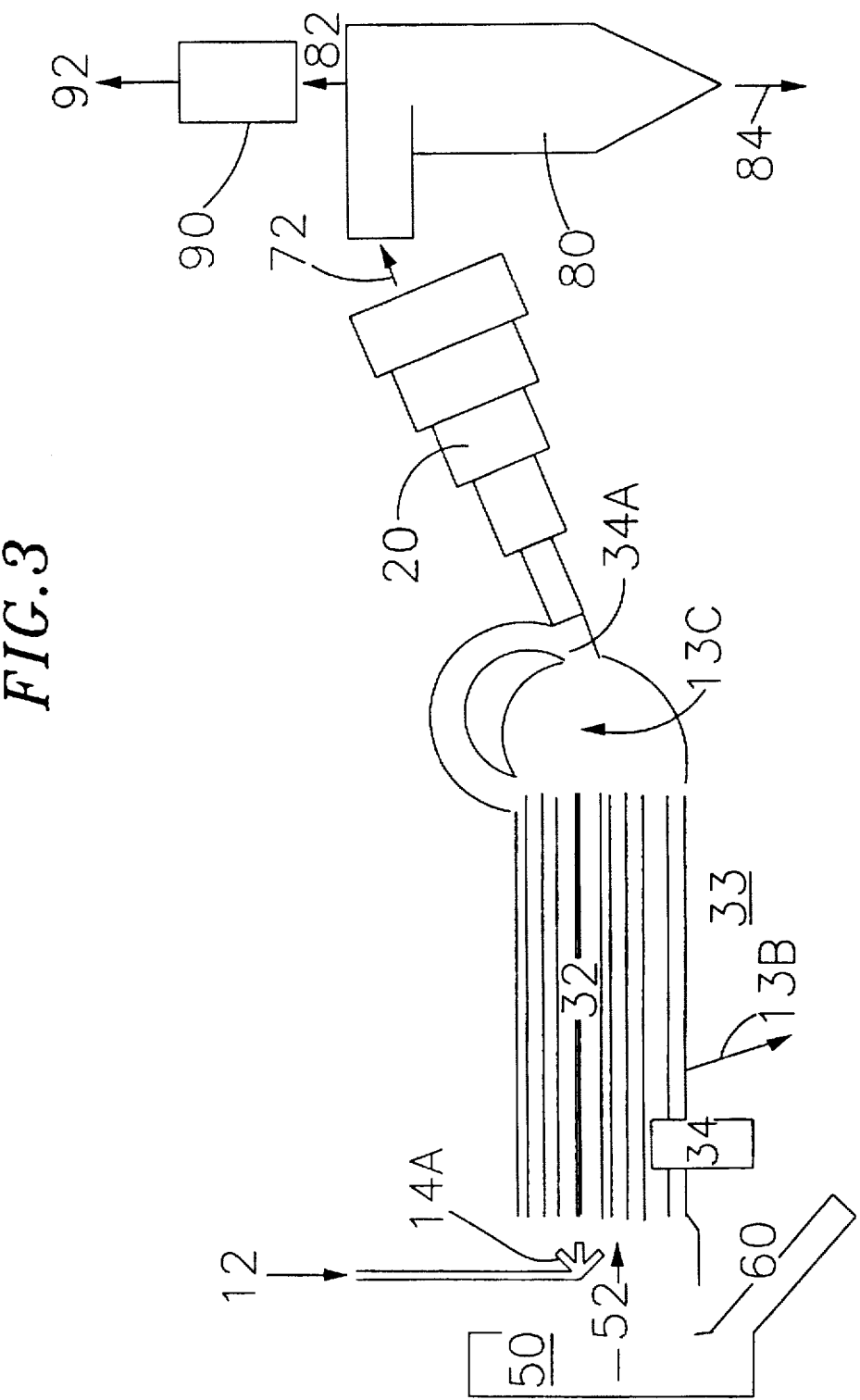

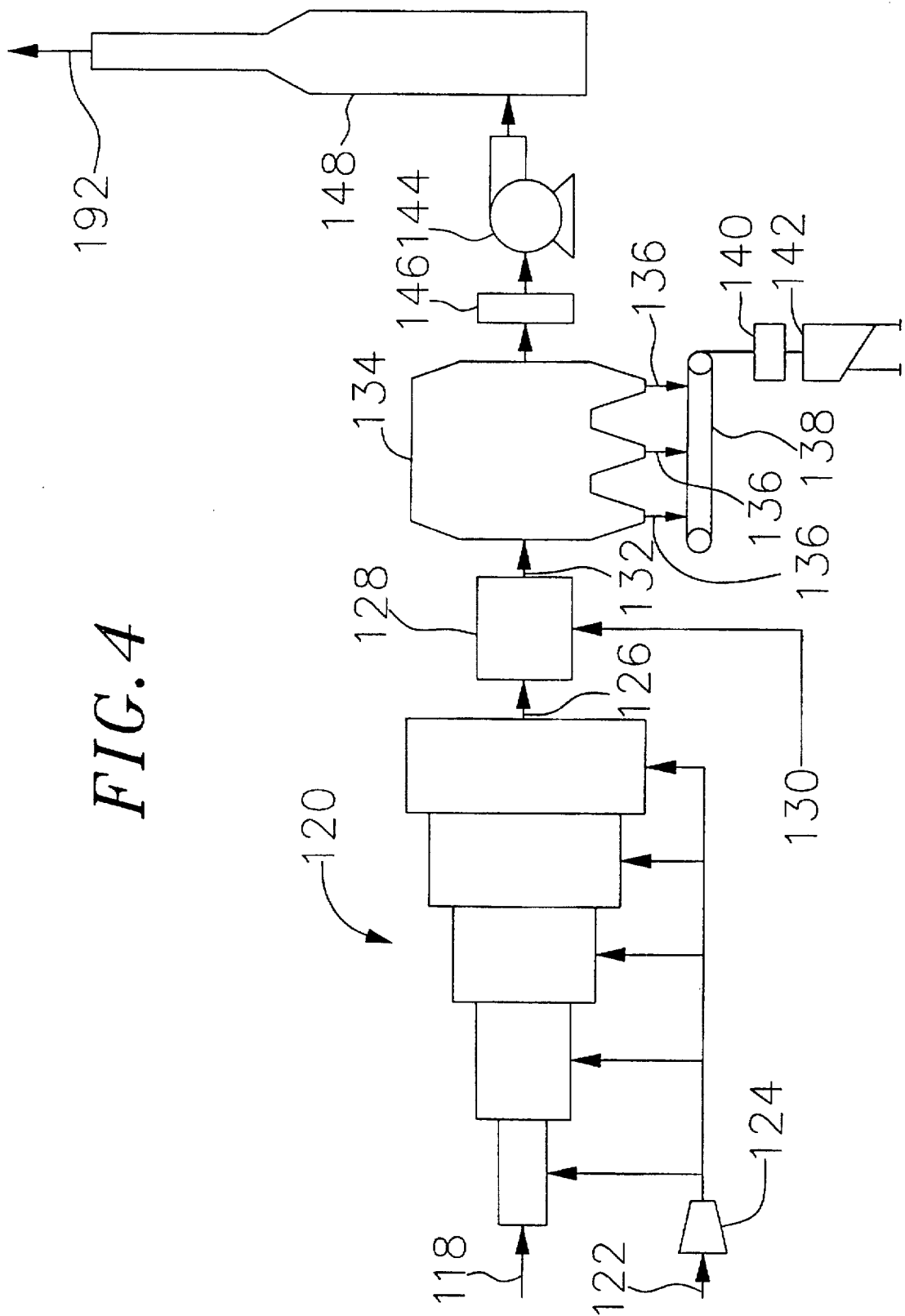

5,744,691

METHOD FOR TREATING SOLIDS CONTAMINATED WITH HYDROCARBONS

CROSS-REFERENCE TO RELATED APPLICATION

This application is a continuation-in-part of Ser. No. 08/382,980, filed Feb. 3, 1995, U.S. Pat. No. 5,625,119, which is a continuation-in-part of Ser. No. 08/068,512, filed May 27, 1993, U.S. Pat. No. 5,414,205.

BACKGROUND OF THE INVENTION

This invention relates to a method for decontaminating soil or other solids that have become contaminated with organic materials such as hydrocarbons. More particularly, it relates to the use of a fluidized bed oxidizer to destroy the contaminants present with the solids.

FIELD OF THE INVENTION

Growing environmental awareness has caused recognition of the potential environmental and health hazards associated with soil that has become contaminated with hydrocarbons. Tanks for storing hydrocarbons such as crude oil or products such as gasoline or diesel sometimes develop leaks resulting in discharge of a portion of their contents into the surrounding soil. Over time the hydrocarbons can accumulate in the soil eventually causing contamination of nearby water supplies.

Solids can also accumulate within the tanks themselves. Over time, these solids can form an emulsion of solids and hydrocarbons often referred to as sludge. This sludge generally forms a layer at the bottom of a tank that must eventually be removed.

An inexpensive way for decontaminating such sludge or contaminated soil is desirable. It is preferred that the equipment for decontaminating such sludge or soil be somewhat portable so that it can be taken to the site of contamination, avoiding the relatively expensive process of moving large quantities of solids to a central processing facility.

SUMMARY OF THE INVENTION

According to the invention, soil that has become contaminated with hydrocarbons is decontaminated by mixing the soil with a hot gas stream containing oxygen in a chamber of a fluid bed oxidizer. The temperature of the hot gas stream should be sufficient to cause spontaneous combustion of the light hydrocarbons from the soil immediately upon contact with the hot gas stream. The gas stream is also used to pneumatically convey the soil through the assembly. The heat generated by the exothermic combustion reaction causes the vaporization and combustion of the rest of the hydrocarbons present in the contaminated soil, leading to flash oxidation.

The hot gas stream (primary air) is preferably provided by an air-blower. A portion of air from the blower is indirectly heated in a suitable assembly and introduced into the oxidizer. The rest of the air (secondary air) is ducted into a concentric outer cylinder around the oxidizer. Through a plurality of perforations, the secondary air enters the oxidation chamber to provide insulation of the oxidation chamber wall from both heat and abrasion.

The soil is introduced into the stream of primary air prior to it entering the preheating assembly as relatively small particles by straining it through a rotary air-lock.

If sludge is to be treated, it is generally sprayed directly into the stream of primary air. If necessary, the sludge can be mixed with oil to decrease its viscosity so that it can be more conveniently sprayed into the oxidation chamber. The combined sludge and primary air stream passes through the preheater and into the oxidation chamber.

The secondary air is introduced tangentially into the outer cylinder. It enters the oxidation chamber through perforations in its wall and keeps the soil and hot gas mixture in a fluidized state. The oxidizer is arranged in five stages of increasing diameter. This maintains approximately constant speed by accommodating the ever increasing gas volume. Turbulent conditions of the fluid phase are created by the tangential introduction of secondary air and by the nonlinear adjustment for increased gas volume.

The product of the incinerator whether soil or sludge is treated is a gas-solid mixture of treated solids and process gas comprising excess hot gas and combustion products. The gas-solid mixture is conveyed to means for separating the decontaminated solids from the process gas. In one preferred embodiment one or more cyclone separators are used for this separation step. In another preferred embodiment, the gas-solid mixture is conveyed to a baghouse for separating the solids from the process gas. The process gas from the separation means can be further treated by conventional means to remove air pollutants that might be present.

The temperature and pressure of the oxidation chamber are controlled by varying the speed of the air-blower and varying the thermal energy introduced in the preheating assembly. Temperature can be further controlled by controlling the amount of secondary air. In one embodiment the fluidized bed oxidizer is arranged on an adjustable incline so that the residence time can be controlled by adjusting the incline. In another embodiment, the residence time is further controlled by controlling the speed of a draft fan on the outlet of a baghouse.

BRIEF DESCRIPTION OF THE DRAWINGS

The features of specific embodiments of the invention are illustrated in the drawings wherein:

FIG. 3 is a schematic block diagram illustrating the process of the invention for treating sludge; and FIG. 4 is a schematic block diagram illustrating another embodiment of the process of the invention in which a baghouse is used to separate the decontaminated solids from the process gas.

DETAILED DESCRIPTION

The present invention relates to a method for decontaminating sand, soil or other solids that become contaminated with organic materials such as hydrocarbons, by incinerating the contaminants in a fluidized bed oxidizer. While the method presented is useful for treating virtually any noncombustible solid, the description of the method is directed to the decontamination of soil in order to simplify the discussion. However, it should be recognized that the term soil is to be broadly understood to include other noncombustible solids as well, as long as the maximum grain diameter is less than about 1 mm. It can also be used to treat an emulsion of solids such as sludge.

Figure 1:
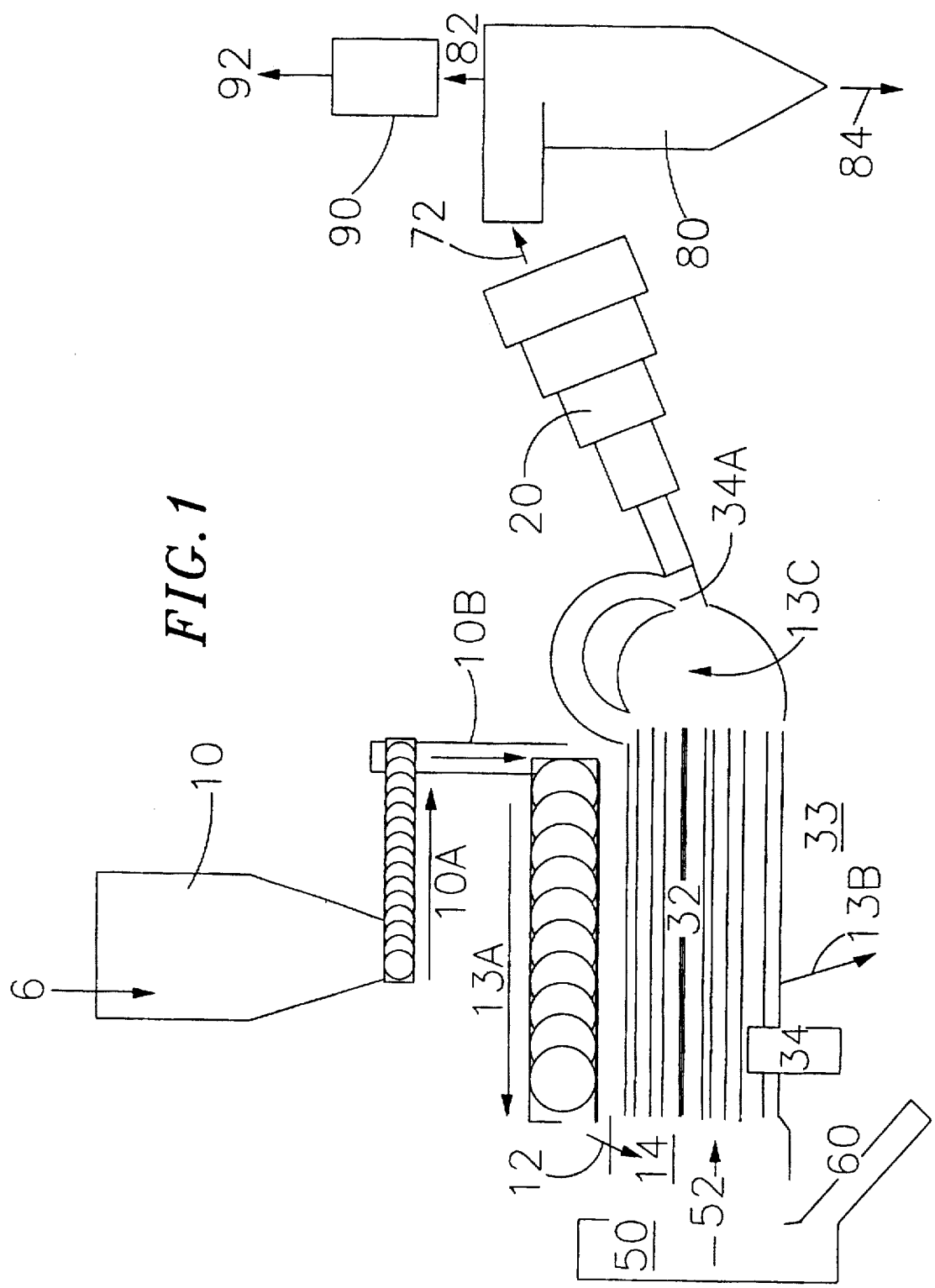
FIG. 1 is a schematic block diagram illustrating the process of the invention for treating soil.

Referring to FIG. 1, feed comprising soil 6 that has become contaminated with hydrocarbons is introduced to an inverted conical hopper 10 which feeds strained soil 12 to a fluidized bed oxidizer 20. The feed is strained by forcing the soil through a rotary air lock 14 located below the delivery from a trommel/mixer/homogenizer 13A. The hopper is preferably capable of holding up to about ten metric tons of contaminated soil. From the hopper, a screw conveyor 10A extracts a measured portion of feed and delivers it to a conveyor belt 10B, which elevates the feed to the trommel. The weight of the feed causes it to be strained through the rotary air lock to create small particles about one millimeter in diameter. The rotary air lock may be a perforated plate having a plurality of holes, each about five millimeters in diameter.

From the air lock the feed drops into the preheating assembly 13B and is pneumatically conveyed into the preoxidizing chamber 13C of the fluidized oxidizer.

If the process is to be used for decontaminating sludge, the sludge 12A is simply sprayed into the preheating assembly through nozzle 14A as illustrated in FIG. 3. If it is necessary to decrease its viscosity, the sludge is first mixed with a liquid such as oil.

In one preferred embodiment, as shown in FIGS. 1 and 3, primary and secondary air are provided by an air-blower which produces a high volume of air 52. Portions of the air-blower circumference are ducted away 60 to provide for secondary air.

In the preheating assembly, the primary air is preheated to a temperature in excess of the flash point of the hydrocarbons by way of indirect heating within metal pipes 32. These pipes are contained within a heater 33 into which burners 34 deliver heat. In the preoxidizing chamber 13C the preheated fluid phase undergoes turbulent motion within an aerodynamically shaped chamber to assure good mixing to form a homogeneous mixture of the gaseous/solid phase. The flue gas is drawn from this heater and ducted to a venturi nozzle 34A after which the flue gas is admixed with primary air to provide a temperature boost and provide for spontaneous combustion within the oxidation chamber of the fluidized bed oxidizer. Sufficient oxygen and temperature levels should be maintained in the oxidation chamber to cause the lighter hydrocarbons present to spontaneously ignite. Oxygen and temperature levels are controlled by the air-blower speed setting and the amount of thermal energy introduced into the preheating assembly by the burners. The heat generated by this exothermic combustion propagates through the fluidized bed to vaporize and burn the other heavier hydrocarbons present in the contaminated soil or sludge by way of flash oxidation.

Figure 2:
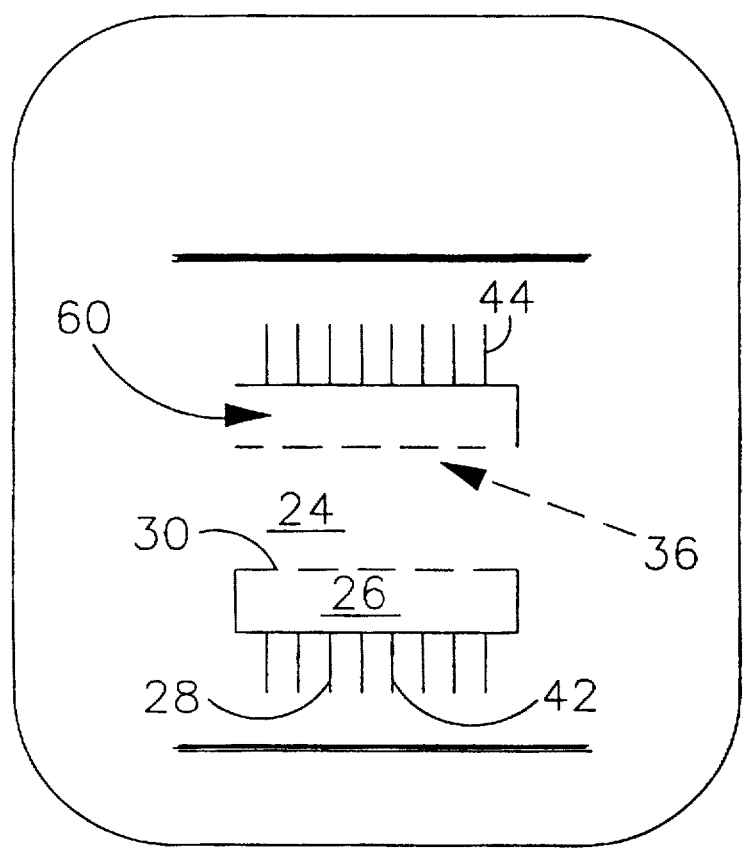
FIG. 2 is a plan view in section of a fluidized bed oxidizer.

Referring to FIG. 2, the fluidized bed oxidizer comprises three concentrically arranged hollow cylinders: an inner cylinder 24, an intermediate cylinder 26 and an outer cylinder 28. The fluidized bed oxidizer is arranged in an inclined configuration so that the flow through the oxidation chamber proceeds in at least a partially upward direction.

The inner cylinder of the fluidized bed oxidizer forms the oxidation chamber. This cylinder is approximately seven meters in length and consists of five successively larger dimensioned stages. The diameter increases from one stage to the next and is governed by the overall size of the unit. The increasing sizes take into account the increased volume of the fluid phase in the oxidation chamber and are aimed at keeping the overall speed of the process approximately constant. The speed variations within each individual stage as well as the tangential nature of introduction of the secondary air will assist in keeping conditions of the fluid bed turbulent, assisting in thorough mixing of the gaseous and solid components and propagation of the combustion process from light to heavy hydrocarbons phases. The residence time of the fluid phase within the oxidizer can be controlled by varying the speed of the air-blower and the incline of the fluidized bed oxidizer.

The oxidation chamber is surrounded by a perforated plate 30. Through holes 36 in the plate, secondary air is drawn from an annular space defined by the walls of the inner and intermediate cylinder according to Bernoulli's law into the oxidation chamber. In this way the wall of the oxidation chamber is insulated from both the temperature of the fluid phase as well as the abrasive action of the pneumatically conveyed solid particles. The introduction of secondary air serves the further purpose of providing additional oxygen for oxidation as well as causing the generation of turbulent flow. Speed increase caused by the gas volume increase is offset by the speed decrease, as the fluid phase enters the next larger stage of the oxidation chamber. As such variability occurs in five pulses, turbulent conditions prevail throughout the residence of the fluid phase within the oxidation chamber.

An outer cylinder surrounds the intermediate cylinder forming a second annular space defined by the intermediate and outer cylinders that acts as a cooling gas chamber 42. Cooling gas channeled through the cooling gas chamber is used to remove a portion of the heat generated by the exothermic combustion reactions in the oxidation chamber. To better improve the heat transfer, the intermediate cylinder includes external radial cooling ribs 44 that are spaced along its length and that extend outward from the intermediate cylinder approximately 0.5 meters into the second annular opening.

The oxidation of the organic material in the contaminated soil produces a gas-solid mixture 72, containing treated solids, excess hot gas and combustion products. Most of the oxidation products are gases such as carbon dioxide and water vapor, but some other solids such as ash may be present. Operation of prototypes has shown, that there is little, if any, ash present. This points to total oxidation; hence the production of any monoxides is theoretically not possible. As the maximum temperature reached in trials was well below 1000° C. it can be safely predicted, that no oxides of nitrogen are produced in the process. Depending on the presence of sulfur compounds within the hydrocarbons, the formation of oxides of sulfur has to be expected. In trial runs, such sulfur compounds were extracted by way of admixture of finely ground lime to the feed leading to instantaneous generation of anhydrite/gypsum. The solid-gas mixture is directed to a gas-solid separator 80 for separation of the gaseous components indicated above from a treated solid stream 84 containing treated soil and possibly some ash.

In one preferred embodiment, cyclone separators are used to perform this separation step. Cyclone separators are generally known and include a cylindrical chamber into which the gas-solid mixture is tangentially directed causing a vortex flow, whereby the inertia of the solid particles directs them to the walls of the chamber by centrifugal acceleration. Upon contact with the wall the solids drop to the bottom of the cyclone by gravity. In the preferred embodiment, the cyclone separator is lined with ceramic material to improve its abrasion resistance. A valve at the bottom of the cyclone separators is used to maintain a level of solid particles and to control flow of solids.

While a single cyclone separator is described, it is clear that multiple separators may be used to improve the gas-solid separation. If multiple separators are used, they can be arranged in series, parallel or some combination of the two.

The process gas 82 from the fluidized bed oxidizer exits the top of the cyclone separators and can be vented to the atmosphere. However, if significant levels of pollutants are present in the process gas, it can be further treated such as by gas scrubbing or selective catalytic reduction in process gas treater 90. Treated process gas 92 can be vented to the atmosphere. It is also possible to recover waste heat from the discharge of process gas by using a heat exchanger to preheat air that is fed to the oxidizer.

Because of its simple and compact design, the equipment used in practicing the present invention can be easily mounted on a flat bed truck, rail car, ship or barge so that the process can be somewhat portable and may be taken to the source of contamination. As the transportation of large quantities of soil or sludge to a central processing facility can be quite costly, this process can significantly reduce the treatment costs associated with soil remediation or sludge decontamination.

Once the soil or sludge has been treated by the process of the present invention, the treated solids can be safely used as fill or otherwise disposed without environmental risk. If the equipment is portable, the contaminated soil or sludge can be collected, treated and replaced or disposed of at the same location.

In another embodiment as illustrated in FIG. 4, rather than using a cyclone separator to separate the treated solids from the process gas, a baghouse is provided. According to this embodiment, the flow through the oxidizer is in a substantially horizontal direction rather than a generally upward direction when an inclined oxidizer is used. Such a configuration is useful for treating contaminated solids such as contaminated soil or sludge.

The preheated fluid phase stream comprising a mixture of solids and air 118 is fed to an oxidizer provided in five sections, each successive section having a diameter larger than the previous. Secondary air 122 is provided by secondary air blower 124 and ducted into each of the five sections of the oxidizer. As set forth in the previous embodiments, the secondary air is preferably fed into the oxidizer through a perforated wall in the oxidizer. The perforated wall surrounds the oxidation chamber and helps to maintain turbulent flow in the oxidizer and insulates the walls of the oxidizer from the high temperature oxidation reactions. In the oxidizer, the organic contaminants present with the solids are destroyed. The flow through the oxidizer is a cocurrent flow and the organics are destroyed in a single pass through the oxidizer without the need for recycling any of the solids. A substantially constant velocity is achieved by the configuration of the oxidizer in which the fluid stream passes through successively larger diameter sections of the oxidizer. This configuration accounts for the expansion of the gas due to increased temperature, additional secondary air, and the formation of combustion products.

From the oxidizer the hot fluid phase mixture of treated solids and process gas 126 enters a cooler 128 into which high pressure water 130 is sprayed to combine with the hot fluid phase mixture. The formation of steam by the water cools the stream. Preferably, water is provided at about 10–20 bars through one or more atomizing sprayers. Generally between 1 and 10 cubic meters per hour of water are required. However, the total amount of water required will depend on the amount of contaminants in the solids to be treated, the reaction conditions of the oxidizer, and the temperature operating limits of the downstream separation equipment.

The cooled gas-solid mixture 132 then enters a baghouse 134 for gas-solid separation. The baghouse is of a conventional design using a battery of fabric bags to separate the solids from the process gas. Periodically, the flow through the fabric bags is reversed causing the solids 136 to fall to the floor of the baghouse. There, a device such as a solids residue drag or screw conveyor 138 removes the solids from the baghouse through a dual flap gate valve 140. The treated solids are collected in transportable storage bins 142 for discharge or disposal.

The cleaned process gas is drawn through the baghouse by a variable speed draft fan 144. A damper 146 on the inlet to the draft fan is closed during startup to minimize current draw. Once the fan reaches a pre-set minimum speed, the damper is opened. The residence time through the oxidizer can be controlled by controlling the speed of the draft fan as well as the flow rates of the primary and secondary air. The speed of the draft fan should be controlled so that the baghouse operates at a pressure from about atmospheric pressure to a slightly negative pressure. The preferred draft fan is designed for flows up to about 60,000 Nm$^3$/hr at 150° C.

From the draft fan, the process gas 192 is discharged through a discharge stack 148. Preferably a 6 meter discharge stack is provided and sized for a gas velocity of about 20 meters per second. Such a velocity will promote dispersal of the process gas while avoiding backwash. The stack may be guyed for stability.

The embodiments described for the process of the present invention are illustrative and are not to be limiting. Various and numerous other arrangements may be devised by one skilled in the art without departing from the spirit and the scope of this invention. The scope of the invention is defined in the following claims.

What is claimed is:

1. A method for treating solids contaminated with organic compounds comprising the steps of:

injecting the contaminated solids into a preheating chamber;

producing a stream of air into the preheating chamber, the air being preheated to a sufficient temperature to initiate spontaneous combustion of a portion of the organic compounds;

combining the contaminated solids and the preheated air at a first end of a cocurrent flow fluidized bed oxidizer;

spontaneously combusting a portion of the organic compounds while generating heat for oxidizing substantially all of the remaining organic compounds and producing a mixture of treated solids and process gas and while pneumatically conveying the solids and process gas in cocurrent flow at a substantially constant velocity through the fluidized bed oxidizer in a generally horizontal direction;

pneumatically removing the mixture of treated solids and process gas from a second end of said fluidized bed oxidizer; and separating the treated solids from the process gas.

2. The method of claim 1 wherein the separating step is performed by a baghouse.

3. The method of claim 2 further comprising a cooling step prior to the separating step.

4. The method of claim 1 wherein the separating step is performed by a cyclone separator.

5. The method of claim 1 further comprising the step of treating the process gas to remove atmospheric pollutants.

6. The method of claim 1 wherein the substantially constant velocity through the fluidized bed oxidizer is achieved by passing the combined solids and process gas into portions of the fluidized bed oxidizer having successively larger diameters.

7. A method for treating solids contaminated with organic compounds the method comprising the steps of:

combining the contaminated solids with a stream of primary air preheated to sufficient temperature to initiate spontaneous combustion of a portion of the organic compounds at a first end of an oxidation chamber;

forming a cocurrent flow fluidized stream of solids and preheated air within the oxidation chamber;

producing a stream of secondary air from a gas manifold surrounding the oxidation chamber into the oxidation chamber through a perforated side wall substantially surrounding the oxidizing chamber;

spontaneously combusting a portion of the organic compounds while pneumatically conveying the fluidized stream in a generally horizontal direction at a substantially constant velocity and while generating heat for oxidizing substantially all of the remaining organic compounds and producing a mixture of treated solids and process gas from a second end of the oxidizing chamber; and separating the process gas from the treated solids.

8. The method of claim 7 wherein the separating step is performed in a baghouse.

9. The method of claim 8 further comprising a step for cooling the mixture of treated solids and process gas.

10. The method of claim 7 wherein the separating step is performed in a cyclone separator.

11. The method of claim 7 further comprising the step of producing the primary and secondary air from an air blower.

12. The method of claim 7 further comprising the step of treating the process gas to remove atmospheric pollutants.

13. The method of claim 7 wherein the substantially constant velocity is achieved by passing the fluidized stream through an oxidizing chamber with a series of successive sections, each successive section having a diameter larger than the diameter of the preceding section.

* * * * *